INVENTOR.
Raymond G. Olson
BY
Kenneth D. Snow
Atty.

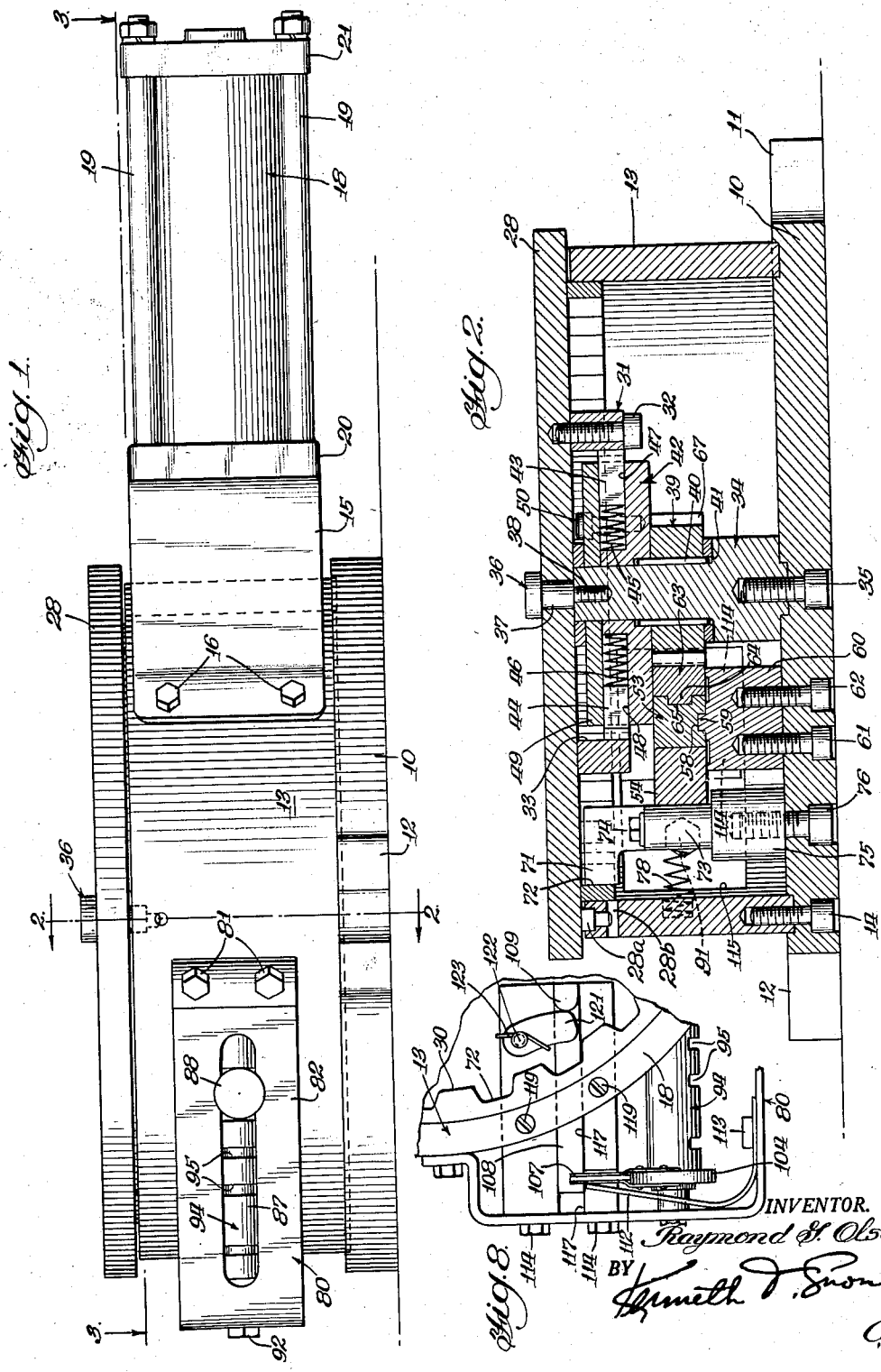

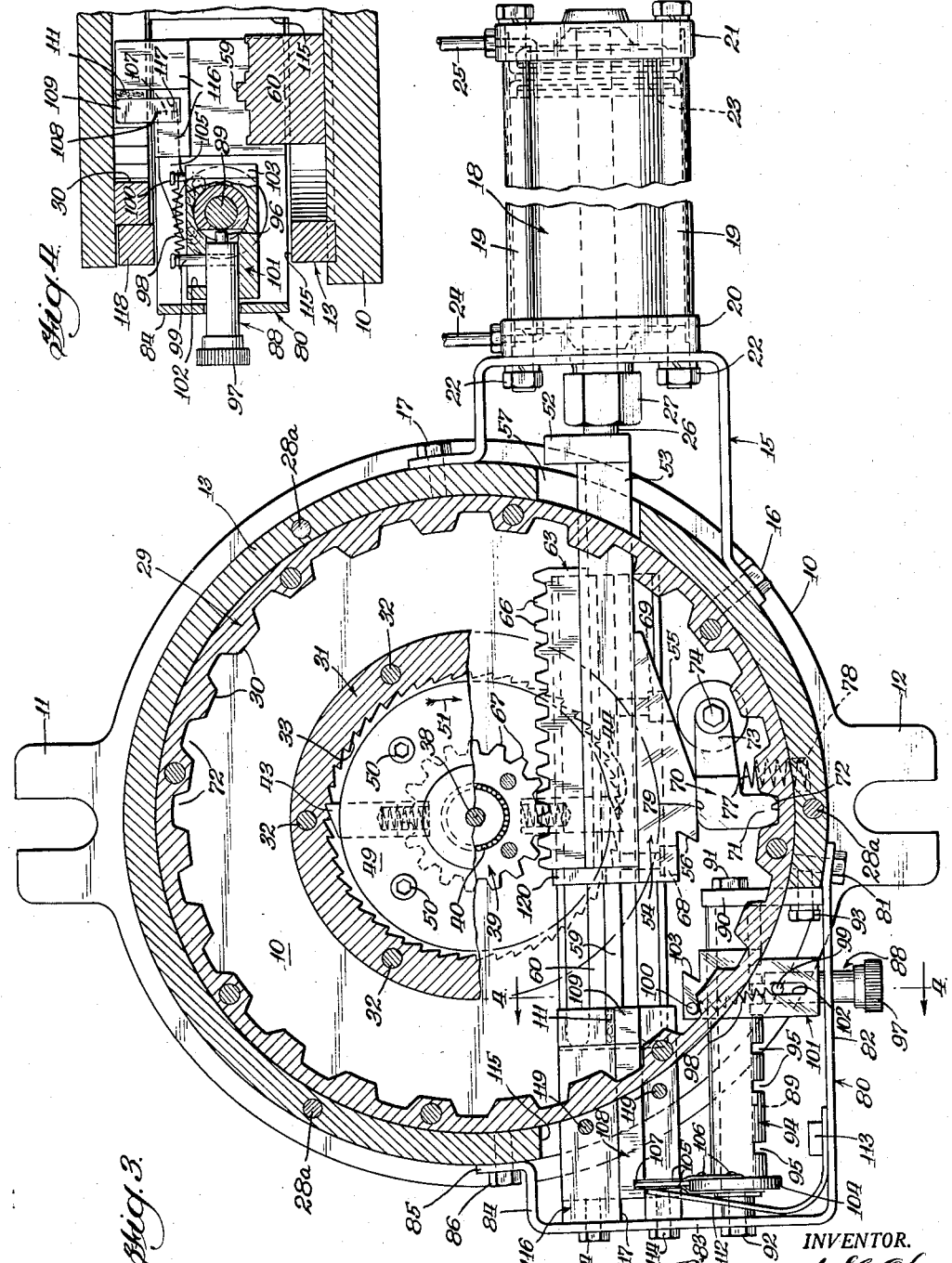

United States Patent Office 2,871,732
Patented Feb. 3, 1959

2,871,732
INDEXING TABLE

Raymond G. Olson, Niles, Ill., assignor, by mesne assignments, to Cleveland Pneumatic Industries, Inc., Cleveland, Ohio, a corporation of Ohio Application February 1, 1956, Serial No. 562,835

6 Claims. (Cl. 77—64)

This invention relates to a new and improved indexing table.

The indexing of a work table, such as for example beneath a drill press spindle is very important in present day industry. Indexing work holding tables are employed for various reasons. If it is desired to perform several work operations on the same piece, it would be desirable to employ an indexing turntable wherein the piece would be moved automatically from beneath one drill press spindle to another. Or, another instance of use of indexing turntables is for the convenience and speed of operation wherein an operator may load one or more stations of a turntable preliminary to the piece to be worked on moving into position beneath a drill press spindle. Also in such a situation the operator may conveniently remove the completed work piece from still another station of the indexing table without at any time stopping operation of the drill press and insuring the performance of work continuously on the number of pieces as they successively move on the turntable into proper position. With this general understanding of the use of an indexing work holding turntable it should be understood that a successful turntable must be accurate and more or less universal in its operation.

A principal object of the work holding indexing table of this invention is to provide a table movable through predetermined arcuate increments and employing means to obtain a uniform positioning of the work table at all stations thereof whereby work being done on any piece in these positions will be uniform regardless of how many times the work table has been operated.

Another important object of this invention is the provision of means for manually adjusting the amount of arcuate movement the work table will make upon each indexing thereof.

Still another important object of this invention is to supply a work holding table capable of being indexed to regular positions about a 360° annular path and including a means for locking the indexing table in any of its indexed positions while work is being performed on a piece held thereby.

Another and still further important object of this invention is to equip an indexing work holding table with means wherein the initial movement of the indexing mechanism unlocks the previously locked turntable whereafter the table is rotated and securely held in its new position preliminary to final locking of the turntable in that position.

Still another important object of this invention is to provide a work holding indexing table operated by fluid cylinder wherein movement of the piston in one direction causes an unlocked condition and rotational indexing of the table a predetermined number of degrees about a circle, and return movement of the piston arranged to avoid turning of the indexing table in a reverse direction but such return movement facilitates the locking of the turntable in its adjusted position.

Other and further important objects and advantages will become apparent from the disclosures in the following specification and accompanying drawings.

In the drawings:

Figure 1 is a side elevational view of the indexing work holding table of this invention.

Figure 2 is a transverse sectional view taken through the work holding table on the line 2—2 of Figure 1.

Figure 3 is a sectional view of the work holding table taken on the line 3—3 of Figure 1.

Figure 4 is a detail sectional view taken on the line 4—4 of Figure 3.

Figure 8 is a detailed view of a modified form of locking and index guiding device such as used in Figure 3.

As shown in the drawings:

Figure 5:
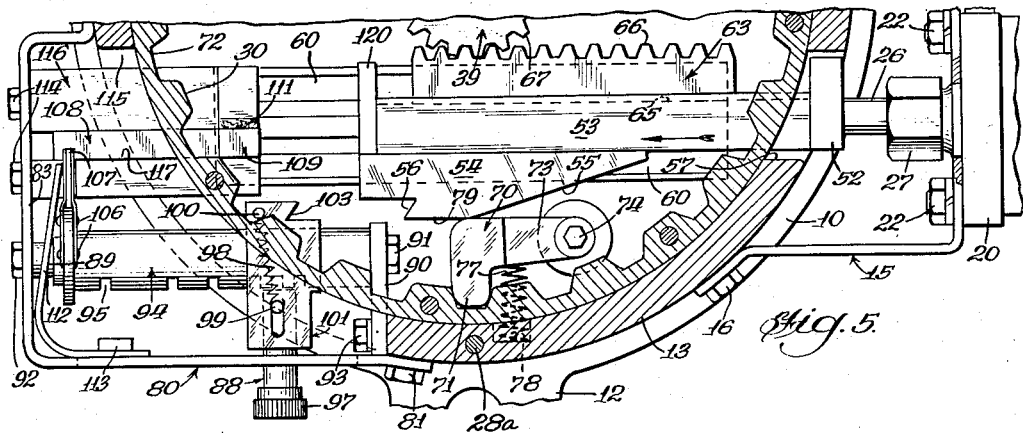
Figure 5 is a detail view of a portion of the device such as shown in Figure 3 wherein the elements are in shifted position.

The reference numeral 10 indicates generally a base having a pair of oppositely disposed U-shaped lugs 11 and 12 as best shown in Figure 3. The base 10 is a part of a frame supporting structure and is equipped to hold the indexing work table of this invention and carry on and in it all of the operating mechanisms thereof. Thus the work table and its supporting base 10 may be fastened in any position to any object by means of bolts passing through the U-shaped lugs 11 and 12. An annular housing 13 projects upwardly from the base 10 and is fixedly mounted with respect to the base 10 by means of spaced screws 14 around the periphery thereof at strategic intervals. As best shown in Figures 1 and 3 a bracket 15 is bolted as shown at 16 and 17 to the outer side wall of the cylindrical housing 13 and is adapted to carry a fluid operated cylinder 18 which extends outwardly therefrom. The cylinder is provided with elongated bolt members 19 arranged to hold end caps 20 and 21 affixed with respect to the central portion of the cylinder 18. These same bolts 19 are adapted and employed to securely hold the cylinder 18 to the bracket 15 by passing through the bracket and having nuts 22 drawn tightly up on the bolts. As best shown in Figure 3 the cylinder 18 is provided with a piston 23 which is reciprocable within the cylinder 18. Fluid under pressure may be delivered through the conduit 24 to effect a movement of the piston 23 in a rightward direction as viewed in Figure 3 or may be delivered through the conduit 25 in which event the piston 23 will move in a leftward direction as viewed in Figure 3. It should be understood that with the admission of fluid under pressure to either one of these ends 20 and 21 of the cylinder the fluid within the cylinder 18 will be exhausted through the conduit leading to the other end thereof. In other words when fluid under pressure is admitted to the cylinder through the conduit 24 fluid within the cylinder will be exhausted through the conduit 25 and vice versa. A piston rod 26 is fastened to the piston 23 and is disposed in parallelism with the elongated cylinder 18. The piston rod 26 projects through the cylinder end 20 and is provided with a bushing 27 to maintain sealing relationship with the shaft and the cylinder to permit reciprocation of the rod without leakage of fluid under pressure therethrough.

The rotating portion of the turntable includes a top platform or table 28 upon which there may be provided work stations (not shown) upon which work pieces may be operated upon. A downwardly depending annular ring 29 of the table top 28 is adapted to rotate on a plurality of button bearings 28a on the top of the cylindrical housing 13 of the stationary supporting structure of this device. Holes 28b are provided in the housing 13 adjacent each of the button bearings to enable a tool to be inserted for driving out the bearings in the event they need to be replaced. Annular ring 29 is equipped with teeth on its internal annular periphery as shown at 30. It is these teeth 30 which provide for the indexing lock of the work table 28 and also the secure locking of the work table 28 when work on any of the elements held thereby is performed. The internal annular teeth 30 are in the form of scallops or the like and as just stated provide for the indexing of the table 28 through the mechanism to be subsequently described. An annular ring 31 is centrally mounted with respect to the turntable 28 and is positioned on the underside thereof extending down within the annular stationary housing 13. Bolts 32 pass upwardly through the ring 31 and threadedly engage the underside of the table top 28. These bolts 32 are spaced at generally regular intervals around the circumference thereof. The inner annular surface of the ring 31 constitutes a ratchet 33 with continuous ratchet teeth extending around the full annular surface thereof.

A central post 34 is fixedly attached to the stationary base 10 by means of a screw 35 extending upwardly through the bottom of the base 10 to threadedly engage the post 34. Although this post and other parts have been shown as fastened to the base, it should be understood they could be made integral therewith as in a casting. A screw 36 passes through the table top 28 and threadedly engages the top of the center post 34. A cylindrical portion 37 of the stationary screw 36 acts as a journal guide for the rotating table 28. The threaded portion of the screw 36 is of a reduced diameter as shown at 38 and engages the top of the stationary central post 34 as just described.

The central post journally receives thereover a spur gear member 39 which is mounted on a needle type bearing 40 disposed on an annular shoulder or offset portion 41 on the post 34. A ring or disc like member 42 is fastened to the top of the spur gear 39 and rotates therewith. The ring member 42 is journaled over the upper portion of the stationary post 34 thereby being maintained in a central position within the indexing table. A one-way clutch is positioned between the rotatable member 42 and the depending ring 31 of the turntable to impart concurrent rotation of these elements in one direction of rotation. The member 42 carries oppositely disposed pawl members 43 and 44 which are spring urged outwardly by reason of the helical springs 45 and 46 respectively. The outer inclined ends of the pawls 43 and 44 are best shown in Figure 3 wherein they are depicted engaging the ratchet teeth on the internal surface of the ring member 31. The diametrically opposed pawl members 43 and 44 slide within passageways formed within the ring member 42 as shown at 47 and 48 respectively. A top closure plate 49 has bolts 50 passing therethrough to engage the ring member 42 and thus hold the members 42 and 49 integral as a unit. Obviously when it is desired to service the pawl members 43 and 44 or their respective biasing springs 45 and 46 the cover plate 49 may be easily removed by taking out the bolts 50 to gain access to the slots or grooves 47 or 48. It should thus be apparent that as the gear 39 is rotated the combination member 42—49 with its one-way clutch in the form of spring urged pawls 43 and 44 will cause rotation of the ring member 31 by reason of the ratchet teeth 33 when the direction of rotation is clockwise as viewed in Figure 3 and as shown by the arrow 51. Simultaneously with the rotation of the ring 31 there is a rotation of the table top 28 and the depending annular ring 29 with its scallop like teeth 30 around the internal annular periphery thereof.

The piston rod 26 as previously described is arranged and constructed to reciprocate from the fluid cylinder 18 and to effect driving of the turntable of this invention. The piston rod 26 of the cylinder and piston 18—23 has fixedly mounted thereon an enlarged collar or the like 52 which generally projects upwardly. Also there is integrally associated with the piston rod 26 and the collar 52 an elongated slide member 53 and a downwardly projecting member 54. The member 54 is located at the outer end of the elongated member 53 and has a tapering cam surface 55 at one side thereof and a hook like notch member 56 at its other side. Thus when the piston rod 26 is extended from the cylinder 18 the collar 52 and the elongated member 53 will pass through an opening 57 in the cylindrical housing 13 of the stationary supporting structure.

As best shown in Figure 2 the elongated sliding member 53 has a groove 58 which extends the length thereof and has cooperating therewith an upwardly projecting tongue 59 from a rail like supporting member 60 which is bolted as at 61 and 62 to the base member 10. A gear rack 63 has a tongue 64 along one side thereof which slidably engages within a groove 65 in the elongated sliding member 53. The bottom of the gear rack 63 slides on the top surface of the stationary rail structure 60. As best shown in Figure 3 the gear rack 63 has a plurality of gear teeth 66 extending from one end of the member to the other. These gear teeth 66 mesh with the teeth 67 of the spur gear 39 previously described as being journaled over the bearing 40 on the central post 34. The downwardly depending member 54 is attached to the slide member 53 by means of bolts 68 and 69. Thus as the piston rod 26 is extended the enlarged collar 52, the slide member 53, and the downwardly depending member 54 commence a leftward movement as viewed in Figure 3.

A table locking member 70 is in the form of a bell crank having one arm 71 arranged and constructed in the shape of a tooth to engage the indentations or scallops 72 between the inwardly raised teeth 30 of the depending annular ring of the table top 28. The angularly disposed other arm 73 of the bell crank 70 is hingedly mounted on a shaft 74 which is carried on and forms a part of a post 75 which is bolted by means of bolts 76 to the base member 10. A spring 77 normally urges the bell crank 70 upwardly about its hinge 74 by reacting against the stationary cylindrical housing 13. The spring 77 is of the helical coil type and is adapted to be recessed in a shallow opening 78 on the inside of the wall 13. When any work is to be performed on material mounted on work stations on the turntable of this invention the locking detent 70 and its tooth 71 is engaged with one of the tooth notches 72 so that the table top 28 is fixed relative to the stationary portions 10—13 of the indexing table.

Figure 6:
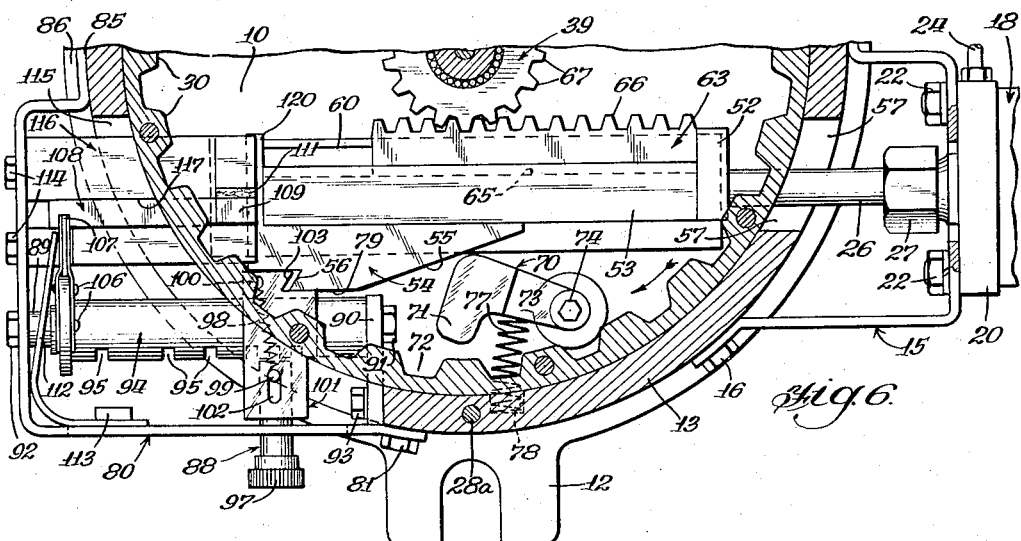
Figure 6 is another detail sectional view of a portion of the device as shown in Figure 3 wherein the elements are moved into a new position.
Figure 7:
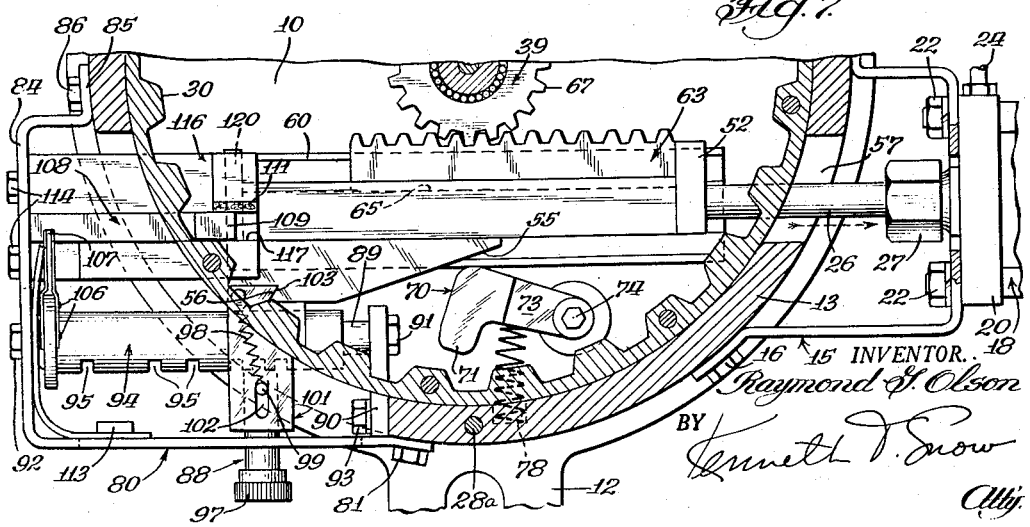
Figure 7 is still another view of the same portion of the device of Figure 3 wherein the relative positioning of the operating elements are in still another position from that shown in Figures 3, 5, and 6.

In operation the piston rod 26 is extended as shown in the successive steps of Figures 5, 6, and 7. In the relative positioning of parts as shown in Figure 3 the tooth 71 is held in firm engagement with the tooth notch 72 by reason of the flat surface 79 of the depending member 54 abutting the back side of the bell crank 70. It is thus obvious that the locking member 70 cannot have its tooth shaped arm 71 removed from engagement with the scalloped teeth 30—72 until such time as the member 54 is moved out of position from engagement with the back side of the bell crank 70. It is clearly shown in the successive views of Figures 5, 6, and 7 that the bell crank 70 is permitted to swing inwardly by reason of actuation of the spring 77 as the piston rod 26 moves further in a leftward direction causing the member 54 to similarly move leftwardly thereupon permitting the back side of the bell crank 70 to ride up on the inclined surface 55 of the member 54. Immediately upon initiating a leftward or extension movement of the piston shaft 26 and associated member 54 the locking element 70 starts disengagement with annular teeth 30—72 whereupon the table is in unlocked position and ready for rotational movement only when collar 52 makes contact with rack member 63. In Figures 6 and 7 the locking element 70 is entirely removed from the annular teeth 30—72 whereupon the table may have rotational movement.

In every indexing cycle, the initial movement of piston rod 26 is to effect the unlock of bell crank 70 from its associated teeth elements 30—72 by movement of slide 53 and cam 54. This so called unlock movement does not cause any rotational movement of the table until collar 52 makes contact with rack gear 63. The collar 52 passes through the opening 57 in the annular housing 13 upon commencement of an extension of the piston rod 26 from the cylinder 18. The initial movement of the piston rod does not and cannot effect a rotation of the turntable, but rather there is a lost motion period during which time the enlarged collar 52 moves leftwardly as viewed in Figure 3 until it approaches the gearing at which time the collar contacts the end of the gear rack 63. This movement is shown in Figures 3, 5, and 6 wherein the collar 52 commences its movement through the opening 57 as shown in Figure 5 and arrives in an abutting relationship with the gear rack 63 in Figure 6 whereafter continued movement of the piston rod 26 in a leftward direction or in extending movement from the cylinder 18 causes a concurrent leftward movement of the gear rack 63. Such movement of the gear teeth 66 effects rotational movement of the teeth 67 of the spur gear 39. As previously described when the spur gear 39 rotates there is a concurrent rotation of the members 42—49 and their included pawl members 43—44. The rotational movement of the pawls 43 and 44 which are spring biased toward engagement with the ratchet teeth 33 on the internal circumference of the annular member 31 cause rotation of the member 31 when the direction of rotation is as shown at 51 in Figure 3. This occurs when there is an extension of the piston rod 26 from the cylinder 18. Conversely when the piston rod 26 is withdrawn into the cylinder 18 the pawls 43 and 44 will automatically ratchet through the ratchet teeth without effecting concurrent rotation of the member 31. This insures that the indexing table will always move in one direction.

A bracket 80 has one end thereof bolted at 81 to the outside of the cylindrical housing 13 spaced oppositely from the bracket 15. A generally flat surface 82 is formed in the bracket 80 from its attachment at 81 whereafter it is formed and bent around as shown at 83 and thence inwardly at 84 and finally forming an end tab 85. The tab 85 abuts the side wall of the cylindrical housing 13 for attachment thereto by a bolt 86. The bracket 80 carries the adjustable mechanism of this indexing turntable. As best shown in Figure 1 an elongated slot 87 is formed in the generally flat portion 82 of the bracket 80 and is adapted to receive therethrough an adjustable knob like member 88 which slides therealong for various adjustments for degrees of rotation of the work table.

A shaft 89 is fixedly mounted on a supporting post 90 within the cylindrical housing 13 at one end thereof and is mounted on the portion 83 of the bracket 80 at its other end. Bolts 91 and 92 are adapted to engage threaded portions of the shaft 89 and thus hold it in fixed position within and without the stationary cylindrical housing 13. The supporting post 90 is shown firmly fastened to the housing 13 by means of a bolt or the like 93 as best shown in Figure 3. The shaft 89 is stationary with the base 10 and the cylindrical housing 13 in the same manner as the supporting post 90 and the bracket 80. Further the shaft 89 is disposed parallel to but laterally offset from the reciprocating operating rod 26.

A sleeve 94 is mounted over the shaft 89 for sliding movement thereon. The sleeve 94 is equipped with longitudinally spaced notches 95 for accomplishing the rotation of the table through various arcuate degrees of rotation. The hand engaging knob member 88 has a reduced diameter inward extension 96 which is adapted to engage any one of the various notches 95 in the sleeve 94. This construction is shown more particularly in the detail of Figure 4. Generally the member 88 constitutes a detent mechanism wherein the operator may grab the outer knurled head 97 and pull outwardly against the action of a spring 98 to thus remove the extension or detent 96 from the particular notch 95 and thereupon slide the member 88 through the elongated opening 87 in the flat portion 82 of the bracket whereupon the member may engage any one of the other notches 95 in the sleeve 94.

A post 99 on the member 88 is adapted to carry one end of the spring 98 and a post 100 mounted on and forming an integral part of a slidable stop member 101 receives the other end of the spring 98. It will be apparent that the spring 98 normally urges the member 88 and its integral detent member 96 into engagement with the sleeve 94 and its various notches 95.

The member 101 is a block-like element which is slidably journaled over the sleeve 94 and is provided with an elongated notch 102 in its top side thereof to permit upward passage of the post 99 carrying one end of the biasing spring 98. The locking member 88 is also journaled within the slidable stop member 101 so that the member 88 and the stop member 101 move together along the sleeve 94 for engagement or disengagement with the various notches 95 in the sleeve 94. When the detent or projection 96 is in engagement with one of the notches 95 movement of the elements 88, 94, and 101 is as an integral unit over the shaft 89. Now when the detent member 88 is pulled outwardly against the action of the spring 98 and the detent 96 is freed from the notches 95 the members 88 and 101 can be moved together longitudinally of the sleeve 94 for engagement with any one of the other notches 95.

The side of the block member 101 opposite the detent element 88 is equipped with a stop in the form of a V-shaped notch or offset 103 for engagement by the notch or hook 56 of the member 54. Depending upon the positioning of the detent member 96 within the notches 95 there will be an earlier or a later movement of the assembled elements 88, 94, and 101 along the shaft 89 by reason of the abutting engagement of the hook or projection member 56 on the member 54 with the V-shaped notch or projection 103 on the member 101.

The outer end of the sleeve 94 contains or is provided with a collar 104 which carries laterally extending spring fingers 105 by means of rivets 106. The spring fingers 105 project into a notch 107 in a member 108 to effect slidable movements thereof. The member 108 is disposed parallel to the sleeve 94 and extends inwardly of the cylindrical housing 13 with an upward tooth-like projection 109 which is adapted to be pulled into engagement with one of the notches 72 formed between the inwardly projecting teeth 30 in the annular ring 29. The surfaces of the detent or locking element 109, and teeth 30—72, are preferably hardened to insure long life of the indexing table. A leather or rubber pad-like member is shown at 111 to provide for the cushioning of movement of the locking element 109 and to prevent undesirable noise when the locking element 109 is pulled into the notch 72 as the sleeve 94 and thus also the slide member 108 are moved in a leftward direction as viewed in Figure 3.

A leaf spring 112 is bolted or otherwise attached at 113 to the bracket 80 and extends around and against the finger 105 thus normally urging the slide member 108 and its locking member 109 out of engagement with the scalloped tooth notches 72. However, when the piston rod 26 is fully extended the locking member 109 will be yieldably pulled into engagement with one of these notches 72 to thereby automatically center the indexing table with respect to that tooth and provide for accurate positioning of the turntable beyond that which would be obtained by the normal extension of the piston rod and rotation of the table by cooperation of the gear teeth 66 and 67. If, for example, the member 88 is engaged with one of the outermost notches 95 in the sleeve 94 there will be a maximum movement of piston rod prior to engagement of the hook or off-set member 66 with the notch 103 in the member 101 whereupon there will be a maximum rotation of the turntable. Conversely if the member 88 is engaged with one of the notches 95 generally close to the inner end of the bracket 80 there will be an early engagement of the members 56 and 103 and a concurrent early engagement of the locking member 109 with the gear teeth 72. It will thus be seen that by a manual setting of the member 88 in any one of the notches 95 there can be accomplished any desired degree of rotation of the work holding table of this invention.

As shown in Figure 3 the rail member 60 is confined within the stationary housing 13 and is fastened to the stationary base member 10 by screws 61 and 62. The bracket 80 covers an opening 115 in the ring 13. The ends of the bracket as previously stated are attached to the cylindrical stationary ring 13. Bolts 114 pass through the bracket and attach to a block member 116. The block 116 is provided with a groove 117 for slidably guiding the lock or detent carrying member 108. It should be understood the opening 115 is cut through centrally of the cylindrical housing 13 leaving an unbroken rail 118 around the top thereof. Further the block 116 is firmly fastened to the top rail 118 of the stationary housing 13 by screws 119. The opening 115 continues throughout a segment substantially co-extensive with the scope of the bracket 80. Thus the mechanisms within the bracket have communication with the interior of the housing 13 for making the various adjustments of the knob 88 to effect changes in the increments of rotation of the turntable. As best shown in Figure 4 the block-like member 116 is fixedly mounted in the housing 13 and is supported above the rail member 60 by screws 119 into the top rail of 13. The block 116 absorbs the shock and carries the leather or rubber cushioning member 111 to silence any noise the relative movement of the detent or locking member 109 might have with the teeth notches 72. The member 109 is used to finally stop the turntable 28 at its exact positioning after the table has been moved the correct amount by the engagement of the gear rack 63 with the spur gear 39.

In the operation of the device of this invention the table top 28 is employed as a work table or sub-table upon which fixtures or a secondary table may be mounted to carry pieces to be worked upon in successive stages. The table is so arranged as to be movable through any desired angular increments so that the successive steps desired in any manufacturing or machining operation may be accomplished with a minimum of effort by the operator. Movement of the turntable 28 relative to the stationary base 10 and the upstanding cylindrical housing 13 is accomplished by means of a reciprocable rod and in this case a fluid operated cylinder 18 and its cooperative piston 23 and piston rod 26. When it is desired to effect a turning of the table 28 fluid under pressure is admitted to the conduit 25 and exhausted through the conduit 24 whereupon the fluid under pressure admitted to the far end of the cylinder 18 causes an extension of the piston rod 26. The initial movement of the piston rod causes an unlocking of the turntable by reason of the movement of the cam member 54 out from abutting engagement with the locking member 70 whereupon the member 70 and its tooth-like detent 71 may swing upwardly by action of the spring 77. This now conditions the table for movement to and through the next increment of movement by the gearing provided therefor. The collar 52 on the piston rod 26 strikes the end of the gear rack 63 when the lost motion employed for the unlocking is completed. When the piston rod continues in its outward movement the collar 52 picks up the gear rack 63 causing the rack to be moved in a leftward direction as viewed in Figure 3 whereupon the spur gear 39 is rotated in the direction of the arrow 51. Such rotation of the spur gear causes concurrent rotation of the table top 28 by reason of the pawls 43 and 44 engaging the annular ratchet teeth 33 to directly move the turntable 28. Obviously the table will continue to rotate as long as the gear rack 63 is moved in an outward direction. However, as soon as the gear rack 63 stops then rotation of the table stops and even though the gear rack is moved back to its starting position all that will happen will be for the pawl members 43 and 44 to ratchet over the teeth 33 by a compressing of the springs 45 and 46. The amount of movement of the gear rack 63 is limited by the positioning of the member 101 relative to the sleeve 94 and as more particularly determined by the engagement of the spring held detent 96 in one of the notches 95. In the position shown in Figure 3 the hook 56 of the member 54 will soon engage the V notch 103 on the member 101 to thereby halt movement of the rotating table and at this point "drive home" the locking element 109 into engagement with one of the teeth scallops 72 as clearly shown in Figure 7. After hook 56 engages notch 103 a slight additional movement of sleeve 94 on shaft 89 causes lock 108—109 to engage teeth 30—72. Obviously greater rotation of the table will be occasioned by positioning the member 101 in one of the outermost notches 95. However, the locking member will finally engage a notch 72 in the same manner as for any positioning of the member 101 with respect to any notch 95. Thus the member 109 guides or otherwise finally indexes the turntable 28 to its exact position during each increment of rotation of the turntable regardless of the amount the table is rotated throughout each extension of the piston rod 26 and no matter in what notch 95 the member may be engaged.

A second collar 120 on the piston rod 26 spaced from the collar 52 and at the opposite end of the slide member 53 is adapted to engage the far side of the gear rack 63 and cause the rack 63 to return to its home position when the piston rod 26 is withdrawn into the cylinder 18 by reason of the reversal of flow of fluid under pressure to and from the cylinder through the conduits 24 and 25. The accurate guiding tooth or detent 109 is disengaged from the notches 72 by the spring arm 112 pushing the member 109 outwardly when the abutting relationship of the cooperative V notched members 56 and 103 is relaxed upon return of the sliding elements in a rightward direction when the piston rod 26 is retracted within the cylinder 18.

It is thus understood that the turntable of this invention may be indexed any predetermined number of arcuate degrees upon the full extension of the piston rod from a cylinder merely by making a manual adjustment of the member 101 relative to the sleeve 94 by reason of the detent 96 of the member 88 engaging any one of the series of notches 95 in the sleeve 94. Obviously the rod 26 may be reciprocated by any means other than fluid under pressure if so desired. The guiding of the table to its proper position is accomplished by the member 109 sliding into one of the teeth 72 and stopping rotation of the table. This, of course, is done for each setting of the turntable and whereafter movement of the piston rod in a return direction will permit the final locking of the turntable in position during the period of work at any one or more of the stations which may be mounted on the turntable. In the return movement the cam surface 55 causes the bell crank 70 to swing outwardly and cause the tooth member 71 to become engaged with one of the scalloped teeth openings 72 and thus hold the table securely while work is done thereon.

Figure 8 shows an alternate stop mechanism. All of the previous elements described for the guide stopping of the index table are employed in this modification and the same reference numerals are used thereon. However, in this alternate device the upward projection 109 of the slide 108 does not move into engagement with the teeth 30—72, but rather is employed to cause an additional or intermediate element 121 in the nature of a pawl to swing into engagement with the teeth for stopping rotation of the indexing table. The table locking element is hinged at 122 on the block 116 and has an arcuate range of movement between engagement and disengagement with the teeth 30—72. Spring means 123 is associated with the hinge pivot 122 to normally urge the locking element out of tooth engagement.

The operation of this modified locking means is the same as for the device as shown in Figures 3, 5, 6, and 7. When the piston rod 26 is extended the slide member 108 pulls the projection 109 radially outwardly of the table thereby causing the pawl element 121 to be yieldably forced into one of the scallops 72 between the inwardly raised teeth 30. This stops the table in the same manner as was previously accomplished by the member 109 alone and for the identical purpose.

I am aware that numerous details of construction may be varied throughout a wide range without departing from the principles disclosed herein and I therefore do not propose limiting the patent granted hereon otherwise than as necessitated by the appended claims.

What is claimed is:

1. An indexing table comprising a stationary supporting structure, an indexing turntable, means journalling said indexing turntable on said stationary supporting structure, means rotating said indexing turntable through predetermined degrees of arcuate movement, said means rotating comprising a reciprocable rod mounted for movement on said stationary supporting structure, gearing interposed between said stationary supporting structure and said indexing turntable, locking means for said indexing turntable, means on said rod for effecting and unlocking of said locking means upon commencement of movement of said rod, and lost motion means on said rod for effecting actuation of said gearing subsequent to said unlocking.

2. An indexing table comprising a stationary supporting structure, an indexing turntable, means journaling said indexing turntable on said stationary supporting structure, means rotating said indexing turntable through predetermined degrees of arcuate movement, said means rotating comprising a reciprocable rod mounted for movement on said stationary supporting structure, gearing interposed between said stationary supporting structure and said indexing turntable, locking means for said indexing turntable, means on said rod for effecting an unlocking of said locking means upon commencement of movement of said rod, lost motion means on said rod for effecting actuation of said gearing subsequent to said unlocking, said indexing turntable including an annular path of internally projecting scalloped teeth, and guiding detent means arranged and constructed to engage said scalloped teeth upon the full extension of said reciprocable rod.

3. A device as set forth in claim 2 in which there is included a manually adjustable mechanism limiting the amount of gearing operation.

4. A device as set forth in claim 3 in which said manually adjustable mechanism includes a shaft mounted on said stationary supporting structure in a position parallel to and spaced laterally from said reciprocable rod, a sleeve journally carried on said shaft for limited longitudinal sliding movement, a slidable stop member mounted on said sleeve, said sleeve having notches in the surface thereof, said slidable stop having a spring biased detent arranged to engage any one of said sleeve notches, a projection on said reciprocable rod for engaging said slidable stop member and limiting movement of said reciprocable rod, and spring means normally urging said sleeve toward said rod projection.

5. A device as set forth in claim 2 in which said locking means includes a bell crank member, one arm of said bell crank member having a tooth shape at its outer end, and cam means associated with said means on said rod for effecting an unlocking of said tooth shape arm upon an extension of said rod and to effect a locking of the tooth shape arm of said bell crank member into the internally projecting scalloped teeth upon a retraction of said rod.

6. A device as set forth in claim 2 in which there is included means associated with said rod for locking said locking means upon retracting said rod from its extended position.

References Cited in the file of this patent

UNITED STATES PATENTS

| 1,660,502 | Gleason et al. | Feb. 28, 1928 |
| 1,909,766 | Johnson et al. | May 16, 1933 |
| 2,592,821 | Powell | Apr. 15, 1952 |
| 2,594,828 | Tripp | Apr. 29, 1952 |